June 18, 1929.  W. L. D'OLIER  1,717,764
SLUDGE COLLECTING DEVICE
Filed Aug. 12, 1925   2 Sheets-Sheet 1
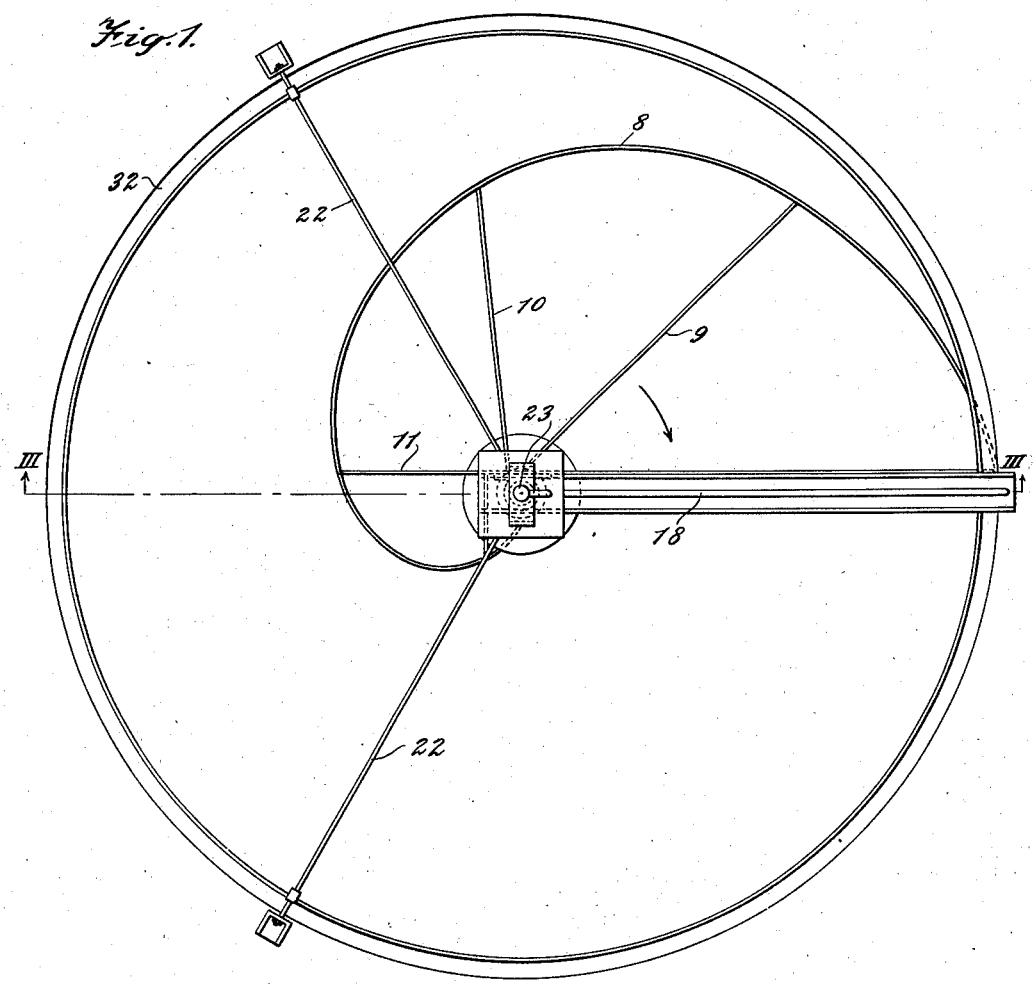
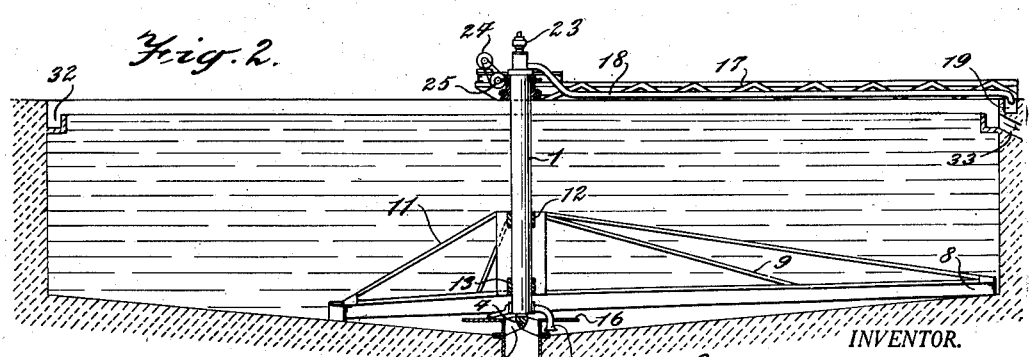
INVENTOR.
William L. O'Olier
BY
Gifford & Scull
ATTORNEYS.

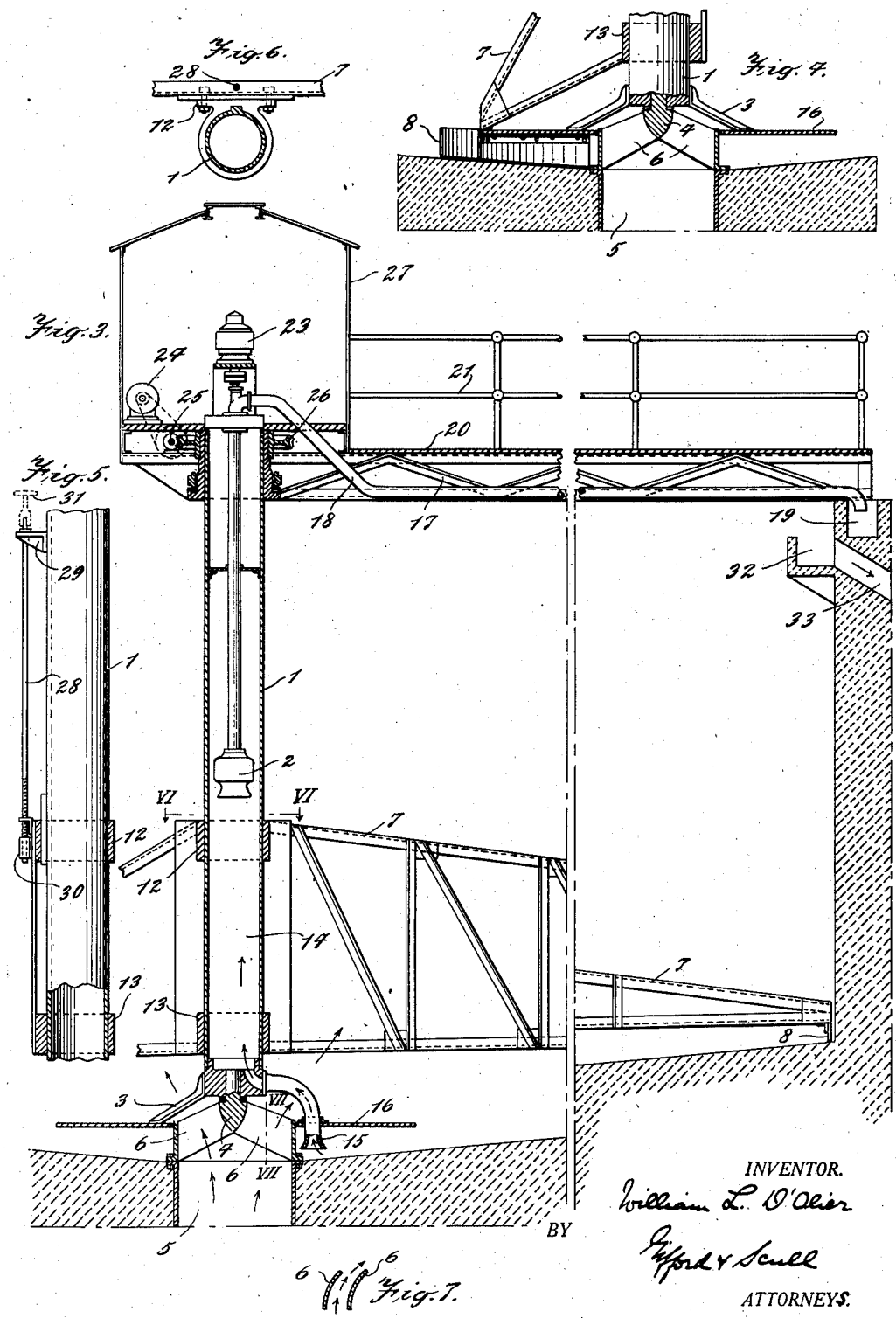

Patented June 18, 1929.

1,717,764

UNITED STATES PATENT OFFICE.

WILLIAM L. D'OLIER, OF PHILADELPHIA, PENNSYLVANIA, ASSIGNOR, BY MESNE ASSIGNMENTS, TO C. H. GRAY AND JOHN SCHAAF, BOTH OF BUFFALO, NEW YORK, AND W. G. PEUCHEN, OF NORTH TONAWANDA, NEW YORK.

SLUDGE-COLLECTING DEVICE.

Application filed August 12, 1925. Serial No. 49,682.

My invention relates to apparatus particularly suitable for collecting the sludge from the bottom of settling tanks, such as are used in the treatment of sewage and the like, and will be better understood from the following description taken in connection with the accompanying drawings forming a part thereof, and in which Fig. 1 is a plan view of a circular tank equipped with my invention;

Fig. 2 is a sectional elevation of the apparatus shown in Fig. 1;

Fig. 3 is a partial vertical section on a larger scale than Fig. 2 with the parts condensed;

Fig. 4 is a detail showing the construction of the lower end of the main support;

Fig. 5 is a detail showing the means for adjusting the position of the scraper relative to the bottom of the tank;

Fig. 6 is a section on line VI—VI of Fig. 3 of the means for adjusting the scraper; and Fig. 7 is a section on line VII—VII of Fig. 3.

Like reference characters indicate like parts throughout the drawings.

In sewage tanks it is desirable to remove the thickened sludge which collects on the bottom of settling tanks so that such thickened sludge may be treated thereafter and the arrangement which I have illustrated accomplishes this purpose effectively.

In the drawings I have illustrated a circular tank. The tank itself may be of any desirable construction, such as concrete. The tank is provided with the usual inlet and outlet openings by which the liquid to be settled may enter the tank and from which the more or less clarified liquid may leave the tank. Mounted centrally of the tank is the main support 1, which is hollow and in which is suitably placed a suction pump 2. The support 1 is provided at the bottom with a bearing 3 which rests upon a support 4 securely fastened to the bottom of the tank. In this instance the support is mounted over the inlet opening 5 through which the liquid to be treated is introduced into the tank. A plurality of supporting members 6 of the general shape shown in Fig. 7 extends across the opening 5 and supports the bearing member which cooperates with the bearing member 3 on the vertical support 1. As will be seen from Fig. 3, the liquid entering through the opening 5 passes into the bottom of the tank with a whirling motion, as shown by the arrows. The whirling, as shown, takes place in the same direction as the whirling set up by rotation of the scraper and suction nozzle, and the frame moving therewith.

Mounted immediately above the bearing member 3 and carried by the support 1, is a scraper support 7. This support is constructed of the usual channel irons and its size and general construction will depend upon the size of the tank in which it is to be used. Carried at the bottom of the support 7 is a scraper 8 which takes the form of a helix, as shown in Fig. 1. In the embodiment shown there are four supports for the scraper, numbered 7, 9, 10 and 11. These supports are mounted upon the rings 12 and 13, which in turn are carried by the support 1 and are loosely fitted around the support 1 so that they may be moved up or down to adjust the position of the scraper relative to the bottom of the tank by means which will be later described.

The suction pump 2 is carried inside the support 1, as shown in Fig. 3, and a suction chamber 14 opens into the tank through the member 15 near the bottom of the tank and also near the base of the support 1. Mounted on the bearing 3 of the support 1 is a disk-shaped member 16 through which the suction member 15 extends. The member or partition 16, as will be seen by reference to Fig. 3, is near the bottom of the tank and acts to localize the suction effect of the member 15. The member 15 is also located at the delivery end of the scraper, as will be more fully explained later.

The upper end of the support 1 carries a bridge 17 which extends from the support to the periphery of the tank. This bridge also carries the discharge pipe 18 of the suction pump 2. The pipe 18 discharges into a gutter 19 extending around the top edge of the tank. This bridge also carries a platform 20 provided with guard rails 21. The support 1 is held in vertical position by tie-rods 22, as shown in Fig. 1, the rods being anchored at one end in the side wall of the tank and at the other end to the support 1.

The motor 23 which is mounted on the top of support 1 acts to drive the suction pump 2 and the motor 24 also carried by the support 1, drives a worm 25 which in turn drives the worm gear 26 to rotate the support 1 and the parts carried thereby to cause, among other things, the scraper to deliver the sludge to the suction device 15. The operator's house 27 is also carried by the support 1 and houses and protects the operating mechanism above described.

The means for adjusting the position of the scraper are shown in Fig. 5 and consist of a rod 28 having one end secured to a bracket 29 carried by the support 1. The lower end of the rod 28 is screw-threaded and is screwed into a nut 30 attached to the rings 12 and 13, which are attached to the supports 7, 9, 10 and 11 of the scraper. A hand wheel 31 mounted on the upper end of the rod 28 when operated acts to move the scraper up or down, depending upon the direction of its rotation.

In operation the material to be treated is introduced into the tank through the opening 5 in the bottom thereof and after standing the required time to produce the desired amount of settling the motor 24 is started as well as the motor 23 whereupon the suction pump 2 creates suction in the inlet nozzle 15 and removes the sludge from the chamber between the bottom of the tank and the plate 16. At the same time the support 1 is caused to rotate slowly, carrying with it the nozzle 15, partition 16 and scraper 8, whereupon the scraper acts to move the sludge which has settled on the bottom of the tank toward the suction nozzle 15, by which the same is progressively removed from different parts of the zone surrounding the center of the tank and adjacent thereto and discharged through the pipe 18 to the gutter 19. The liquid which has been more or less clarified by the treatment overflows into the gutter 32 and is discharged at 33. This operation continues at a speed dependent upon the nature of the material being treated.

Changes may be made in the details of construction and in the arrangement of the parts above described within certain limits without departing from the spirit of my invention.

I claim:

1. In a device of the character described, a tank, a suction device having an inlet near the center of the bottom of the tank but spaced therefrom, means for moving said inlet about said center, and means for moving sludge along the bottom of the tank toward said inlet.

2. In a device of the character described, a tank, a rotatable suction device near the center of the bottom of the tank, and helical means for moving sludge along the bottom of the tank toward said suction device.

3. In a device of the character described, a tank, a suction device near the center of the bottom of the tank, a rotatable support for said suction device, a scraper mounted on said support and acting to move sludge along the bottom of the tank toward said suction device and means for localizing the effect of said suction device.

4. In a device of the character described, a tank, a suction device near the center of the bottom of the tank, a rotatable shaft supporting said suction device, a scraper slidably mounted on said support and acting to move sludge along the bottom of the tank toward said suction device, means for localizing the effect of said suction device, and means for adjusting the scraper relative to the bottom of the tank.

5. In a device of the character described, a tank, a suction device near the center of the bottom of the tank, a rotatable support for said suction device resting on the center of said bottom, a scraper slidably mounted on said support to rotate therewith and acting to move sludge along the bottom of the tank toward said suction device, means for localizing the effect of said suction device, and means for discharging the sludge to the exterior of the tank.

6. In a device of the character described, a tank, a suction device near the center of the bottom of the tank, a rotatable support for said suction device resting on the bottom of said tank and stayed to the sides of the tank, a scraper mounted on said support and acting to move sludge along the bottom of the tank toward said suction device, means for localizing the effect of said suction device, and means for rotating the scraper support.

7. In a device of the character described, a tank, a suction device near the center of the bottom of the tank, a rotatable support for said suction device, a scraper mounted on said support and acting to move sludge along the bottom of the tank toward said suction device, means for localizing the effect of said suction device, means carried by the support for discharging the sludge to the exterior of the tank and means for rotating the support, scraper and discharge means.

8. In a device of the character described, a circular sludge tank, a support mounted centrally of said tank with its base resting on the bottom, a suction device mounted on said support and opening into the tank near the base of said support but spaced therefrom, a scraper mounted on said support, means for rotating the scraper to move the sludge toward the suction device and means for localizing the effect of said suction device near the delivery end of the scraper.

9. In a device of the character described, a circular sludge tank, a hollow support mounted centrally on the bottom of the tank, a suction device mounted in said hollow support and opening into the tank near the bottom of the tank, a scraper mounted on said support and acting to move the sludge toward the suction device, means localizing the action of said suction device around the delivery end of said scraper, means for rotating said scraper and means slidably carried on the support for adjusting the scraper relative to the bottom of the tank.

10. In a device of the character described, a circular sludge tank, a hollow support mounted centrally of the tank, a suction device mounted in said hollow support and opening into the tank near the bottom of the tank, a scraper mounted on said support and acting to move the sludge toward the suction device, means localizing the action of said suction device around the delivery end of said scraper, means adjacent the suction opening for delivering fluid to the tank with a whirling motion, means for discharging the sludge from the tank and means for conducting off the clarified liquid from which the sludge has been taken.

11. In a device of the character described, a tank, a hollow support on the bottom of said tank, said support having a wall, fins extending inwardly from said wall and carrying a center pivot, and means rotatably mounted on said pivot and adapted to remove sludge from said tank.

12. In a device of the character described, a tank, a hollow support and inlet to the tank on the bottom of said tank, said support having a wall, curved fins extending inwardly from said wall to give the incoming fluid a whirling motion and carrying a center pivot and means rotatably mounted on said pivot and adapted to remove sludge from said tank.

13. In a device of the character described, a tank, a hollow support on the bottom of said tank, said support having a wall, fins extending inwardly from said wall and carrying a center pivot, means rotably mounted on said pivot and adapted to remove sludge from said tank, and a partition plate mounted on said means and above the bottom of said tank to separate the incoming fluid from the outgoing sludge.

14. In a device of the character described, a tank, a hollow support in the bottom of said tank, said support having an outer wall extending above the bottom of said tank and forming an inlet passageway, means rotatably mounted on said support and adapted to remove sludge from said tank, a partition plate mounted on said means adjacent the top of the wall and closely associated therewith to separate the incoming fluid from the outgoing sludge, and suction means passing through said plate adjacent said wall.

15. The method of removing solids from a tank of liquor containing the same, comprising the steps of whirling the solution slowly in horizontal planes, moving the precipitated solids toward the center of the tank and removing them progressively from different parts of a zone surrounding the center and adjacent thereto.

16. The method of continuously removing solids from a tank of liquor containing the same, comprising the steps of injecting the fluid centrally of the bottom of the tank with a whirling motion, whirling the solution slowly in horizontal planes, moving the precipitated solids toward the center of the tank and removing them progressively from different parts of a zone surrounding the center and adjacent thereto.

17. In a device of the character described, a tank, a pump having an inlet disposed adjacent the bottom of said tank, means for moving said inlet over the bottom of the tank, and a partition disposed above said inlet to localize the effect of said pump.

18. In a device of the character described, a tank, a pump having its inlet disposed adjacent the bottom of said tank, a scraper to move sludge deposited in said tank, and means to move said inlet and scraper over the bottom of said tank with the nozzle in advance of the scraper.

19. In a device of the character described, a tank, a pump having its inlet disposed adjacent the bottom of said tank, a scraper to move sludge deposited in said tank, and means to move said inlet and scraper over the bottom of said tank with the nozzle in advance of the scraper, said scraper being shaped to move sludge towards said inlet.

20. In a device of the character described, a tank, a pump disposed in said tank, and means to rotate said pump, said pump having an inlet spaced from the center of rotation thereof.

21. In a device of the character described, a tank, a pump disposed in said tank, means to rotate said pump, said pump having an inlet spaced from the center of rotation thereof, and a scraper rotating with said pump and adapted to move sludge towards said inlet.

22. In a device of the character described, a tank, a pump disposed in said tank, means to rotate said pump, said pump having an inlet spaced from the center of rotation thereof, and a scraper rotating with said pump and adapted to move sludge towards said inlet, said scraper being in helical form, and said inlet being disposed adjacent the discharge end of said helix.

WILLIAM L. D'OLIER.